US006304997B1

(12) United States Patent
Huber

(10) Patent No.: US 6,304,997 B1
(45) **Date of Patent: *Oct. 16, 2001**

(54) METHOD AND CIRCUIT ARRANGEMENT FOR MULTIPLYING FREQUENCY

(75) Inventor: Klaus Huber, Darmstadt (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,017

(22) Filed: Feb. 11, 1998

(51) Int. Cl.[7] .......... G06F 17/50
(52) U.S. Cl. .......... 716/1; 716/17
(58) Field of Search .......... 395/500.02, 500.18; 716/1, 17, 4; 702/75; 708/800, 819, 835, 845

(56) References Cited

U.S. PATENT DOCUMENTS

| | | | |
|---|---|---|---|
| 4,163,960 | 8/1979 | Ernyei et al. | 333/198 |
| 4,327,341 | 4/1982 | Ernyei | 333/197 |

FOREIGN PATENT DOCUMENTS

| | | |
|---|---|---|
| 32 31 919 | 3/1984 | (DE) . |
| 33 03 133 | 8/1984 | (DE) . |

OTHER PUBLICATIONS

Safaai–Jazi, “A New Method for the Analysis and Design of Chebysev Arrays,” IEEE, pp. 157–161, 1994.*
Surakampoontorn, “Sinuooidal Frequency Doubles Using Operational Amplifiers,” IEEE Trans. on Instrumentation and Measurement, vol. 37, No. 2, pp. 259–262, 1988.*

Wu et al.,“A Low–Power and Low–Complexity DCT/IDCT VLSI Architecture Based on Backward Chebyshev Recursion,” ISCAS ’94, pp. 155–158, 1994.*

U. Tietze et al., “Halbleiterschaltungstechnik,” [Semiconductor Circuit Engineering], Springer Publishers, 1980,* no pg #.

I. Schur, “Arithmetisches über die Teschebyscheffschen Polynome,” [Arithmethic [Aspects] of Chebyshev Polynomials], Springer Publishers 1973, Collection of Treatises vol. III, pp. 422–453.*.

Abramawitz, Stegun: Handbook of Mathematical Functions,* no pg #, no date.

* cited by examiner

*Primary Examiner*—Matthew Smith
*Assistant Examiner*—Leigh Marie Garbowski
(74) *Attorney, Agent, or Firm*—Kenyon & Kenyon

(57) ABSTRACT

A method and circuit arrangement for frequency multiplication. A plurality of circuit modules for realizing Chebyshev polynomials of the nth order $T_n(x)$) are provided. The Chebyshev polynomials have arithmetic properties and are defined by $T_n(\cos(\omega t))=\cos(n\omega t)$. The circuit modules are interconnected to form a modular circuit array or a modular circuit structure using one or more of the relations $T_{nm}(x)=T_n(T_m(x))$ and $T_{n+m}(x)=T_n(x)T_m(x)-T_{n-m}(x)$. A cosinusoidal oscillation of a frequency is input into the Chebyshev circuit module ($T_n(x)$) to generate a cosinusoidal oscillation having n-fold frequency. Frequency multiplier circuits may be produced very simply and in modular form, making applications in telecommunications, in particular, very cost-effective.

17 Claims, 1 Drawing Sheet

METHOD AND CIRCUIT ARRANGEMENT FOR MULTIPLYING FREQUENCY

FIELD OF THE INVENTION

The invention relates to a method and a circuit arrangement for frequency multiplication.

RELATED TECHNOLOGY

From telecommunications and computer engineering, one knows of analog frequency multiplication methods used for various purposes. Circuit arrangements designed for these various purposes are also known, which multiply the frequencies of sinusoidal and cosinusoidal oscillations. In this context, the circuit expenditure is considerable, particularly when working with multiples, which are not a square (power of two) of the output frequency, since, depending on the particular realization, additional division circuits might even be necessary. Circuits of this kind, designed, for example, as PLL (phase-locked loop) circuits, are described, for example, in the book by U. Tietze, Ch. Schenk, Halbleiterschaltungstechnik [Semiconductor Circuit Engineering], Springer Publishers, 1980. The Chebyshev polynomials of the nth order are defined by the equation $T_n(\cos(\psi))=\cos(n\psi)$.

The Chebyshev polynomials are described for example in I. Schur, "Arithmetisches über die Teschebyscheffschen Polynome" [Arithmethic Aspects of Chebyshev Polynomials], Collection of Treatises vol. III, pp. 422 to 453, Springer Publishers 1973 which is hereby incorporated by reference herein.

SUMMARY OF THE INVENTION

An object of the present invention is to provide a method and a circuit arrangement for performing analog frequency multiplication using simple and easily combined modules, which will eliminate, in particular, the need for division circuits used in existing methods, when it is required to produce multiples of a fundamental frequency which are not a power of two thereof.

The present invention provides a method of frequency multiplication, the method including providing a plurality of circuit modules for realizing Chebyshev polynomials of the nth order $T_n(x)$), the Chebyshev polynomials having arithmetic properties and being defined by $T_n(\cos(\omega t))=\cos(n\omega t)$. The circuit modules are interconnected to form a modular circuit array or a modular circuit structure using at least one of the relations $T_{nm}(x)=T_n(T_m(x))$ and $T_{n+m}(x)=T_n(x)T_m(x)-T_{n-m}(x)$. A cosinusoidal oscillation having a first frequency is applied to an input of the circuit module for the Chebyshev polynomial ($T_n(x)$) so as to generate a cosinusoidal oscillation having a second frequency at an output of the circuit module, the second frequency being a factor of n times the first frequency.

The present invention also provides a circuit arrangement for frequency multiplication, the circuit arrangement including a first circuit module for realizing a first Chebyshev polynomial $T_m(x)$ defined by $T_m(\cos(\omega t))=\cos(m\omega t)$, the first circuit module being capable of accepting a first sinusoidal/cosinusoidal oscillation input having a first frequency and outputting a third sinusoidal/cosinusoidal oscillation having an third frequency, the third frequency being a factor of m times the first frequency. A second circuit module is provided for realizing a Chebyshev polynominal $T_n(x)$ defined by $T_n(\cos(\omega t))=\cos(n\omega t)$, the second circuit module being capable of accepting a second sinusoidal/cosinusoidal oscillation input having a second frequency and outputting a fourth sinusoidal/cosinusoidal oscillation having fourth frequency, the fourth frequency being a factor of n times the second frequency, the second circuit module being connected to the first circuit module to form a modular circuit array or a modular circuit structure using at least one of the relations $T_{nm}(x)=T_n(T_m(x))$ and $T_{n+m}(x)=T_n(x)T_m(x)-T_{n-m}(x)$.

The present invention also provides a circuit arrangement for frequency multiplication where the circuit arrangement includes a first circuit module for realizing a first function $T_m(x)$ defined by $T_m(x)=(\frac{1}{2})((x+(x^2-1)^{1/2})^m+(x-(x^2-1)^{1/2})^m)$, m being a rational or a real number, the first circuit module being capable of accepting a first sinusoidal/cosinusoidal oscillation input having a first frequency and outputting a third sinusoidal/cosinusoidal oscillation having an third frequency, the third frequency being a factor of m times the first frequency. A second circuit module is provided for realizing a second function $T_n(x)$ defined by $T_n(x)=(\frac{1}{2})((x+(x^2-1)^{1/2})^n+(x-(x^2-1)^{1/2})^n)$, n being a rational or a real number, the second circuit module being capable of accepting a second sinusoidal/cosinusoidal oscillation input having a second frequency and outputting a fourth sinusoidal/cosinusoidal oscillation having fourth frequency, the fourth frequency being a factor of n times the second frequency, the second circuit module being connected to the first circuit module to form a modular circuit array or a modular circuit structure using at least one of the relations $T_{nm}(x)=T_n(T_m(x))$ and $T_{n+m}(x)=T_n(x)T_m(x)-T_{n-m}(x)$.

An advantage of the method and device of the present invention is that, by using structures derived from Chebyshev polynomials, a frequency multiplication is able to be achieved using simple and easily combined modules or modular circuit structures.

If a cosinusoidal oscillation is expressed as an input variable in terms of $T_n(x)$, then a cosinusoidal oscillation with an n-fold frequency is obtained at the output. Information on Chebyshev polynomials can be found, for example, in Abramawitz, Stegun: Handbook of Mathematical Functions. The first Chebyshev polynomials are expressed as: $T_o(x)=1$, $T_1(x)=x$, $T_2(x)=2x^2-1$, etc. in accordance with $T_{n+1}(x)=2xT_n(x)-T_{n-1}(x)$. They can be produced using multiplier circuits and adder or subtracter circuits. To realize any n, the following relations are particularly helpful:

$$T_{n-m}(x)=T_n(T_m(x))$$

$$T_{n+m}(x)=2\cdot T_m(x)\cdot T_n(x)-T_{n-m}(x).$$

The Chebyshev polynomials, as well as the multiplier circuits and summing circuits, i.e., adder or subtracter circuits required for an implementation in terms of circuit engineering, are able to be realized using integrated circuit engineering, and are then able to perform the most widely varying, desired functions, depending on the external wiring or interconnections. Other functions mentioned here which can be easily realized with such a chip are the synthesis of any desired functional progression by expressing the function as a Chebyshev series, or using the function $T_n(x)$ as an amplifier having a gain n for small x where $\sin(nx)\approx nx$, and for uneven (odd) n.

The present invention will be elucidated in the following on the basis of embodiments depicted in the drawings. The terms specified in the list of reference symbols at the end of this document and the associated reference symbols are used in the Specification, in the Claims, and in the Abstract.

DETAILED DESCRIPTION

First, the mathematical fundamentals of the method and circuit arrangement will be described. According to the present invention, structures derived from Chebyshev polynomials are used, which make it possible to realize any desired frequency multiplication by means of simple and easily combined circuit modules. The Chebyshev polynomials of the n-th order $T_n(x)$ are defined by the equation $$T_n(\cos(\psi))=\cos(n\psi), \tag{1}$$

i.e., if one specifies a cosinusoidal oscillation as an input variable in terms of $T_n(x)$, then a cosinusoidal oscillation with an n-fold frequency is obtained at the output. Information on Chebyshev polynomials can be found, for example, in Abramawitz, Stegun: Handbook of Mathematical Functions which is hereby incorporated by reference herein. The first Chebyshev polynomials are expressed as: $T_o(x)=1$, $T_1(x)=x$, $T_2(x)=2x^2-1$, etc. They can be produced using multiplier circuits and adder or subtracter circuits. To realize any n, the following relations are particularly helpful:

$$T_{n-m}(x)=T_n(T_m(x)) \tag{2}$$

$$T_{n+m}(x)=2\cdot T_m(x)\cdot T_n(x)-T_{n-m}(x) \tag{3}$$

Figure 1:
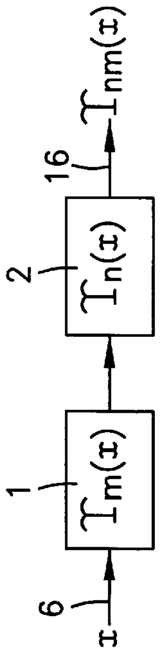
FIG. 1 shows a circuit arrangement for realizing $T_{nm}(x)$.
Figure 2:
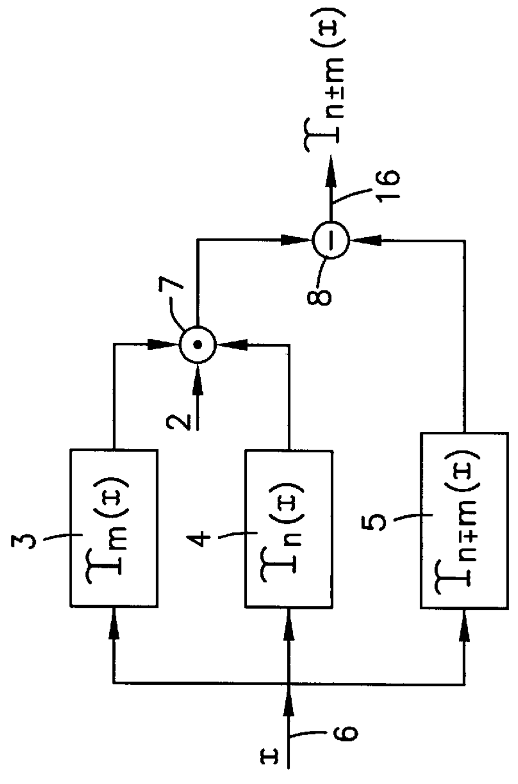
FIG. 2 shows a circuit a arrangement for realizing $T_{n+m}(x)$.

Circuits for equations (2) and (3) are illustrated in FIGS. 1 and 2.

The circuit for equation (2), constructed and realized on this basis, is comprised of two series-connected Chebyshev modules 1 and 2, the input variable being applied with the fundamental frequency at the input of Chebyshev module 1, and the output variable being applied with the frequency multiplied by the factor n.m at the output of Chebyshev module 2. A realization of equation (3) is shown in FIG. 2. This circuit is comprised of Chebyshev modules 3, 4 and 5, whose inputs are all fed the input variable with the fundamental frequency. The outputs of Chebyshev modules 3 and 4 lead to the input of a multiplier circuit 7, at whose other input a 2 is applied for multiplication purposes. The output of multiplier circuit 7, together with the output of Chebyshev module 5, leads to a subtracter circuit 8, at whose output the function $T_{n+m}(x)$ is applied when the function $T_{n-m}(x)$ is realized in Chebyshev module 5, and $T_{n-m}(x)$, when the function $T_{n+m}(x)$ is realized in Chebyshev module 5.

At this point, the Chebyshev module $T_N(x)$ is able to be constructed from the circuits of FIGS. 1 and 2, for any desired value N. In this context, different possible realizations result depending on N. One skilled in the art will select the particular realization as a function of the costs. For the sake of simplicity, a realization based on operational amplifiers is assumed in the following. The circuits indicated are not necessarily equally suited for each application case. Depending on the costs of the components needed, in some instances, other realizations would be easily possible and more cost-effective. With the aid of the equations indicated here, the design can be easily modified and tailored to the particular application case.

Figure 3:
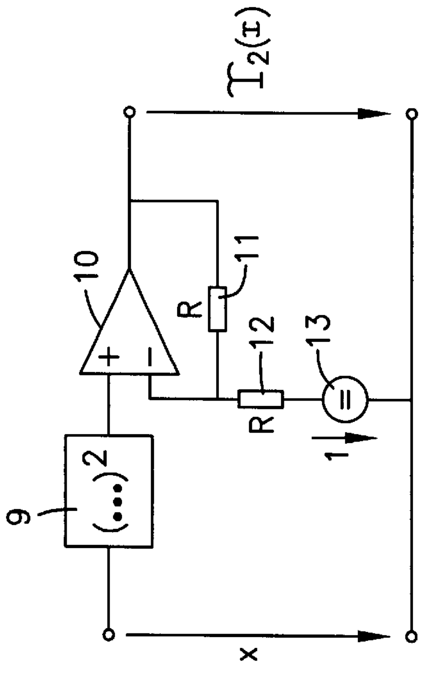
FIG. 3 shows a circuit arrangement for realizing $T_2(x)$.
Figure 4:
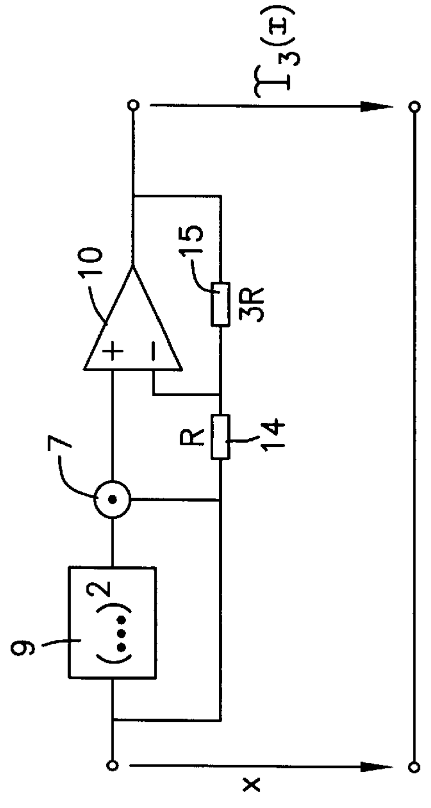
FIG. 4 shows a circuit arrangement for realizing $T_3(x)$.

Using the operational amplifier circuits known in circuit engineering, circuits shown in FIGS. 3 or 4 may be implemented for the first non-trivial polynomials $T_2(x)$ and $T_3(x)$. If $K_n$ denotes the costs of realizing function $T_n(x)$, it can then be inferred from FIG. 3 that polynomial $T_2$, implemented with operational amplifiers, results in the costs of a squaring circuit 9, an operational amplifier 10, two resistors 11 and 12, as well as of a constant voltage source 13. It is, thus, apparent that a circuit of this kind renders possible an inexpensive realization of frequency-multiplication circuits.

The circuit according to FIG. 4 for realizing the function $T_3(x)$ is comprised, in turn, of a squaring circuit 9, a subsequent multiplier circuit 7, as well as of an operational amplifier 10, whose output signal is fed back via a voltage divider, comprised of resistors 14 and 15, to its input. The corresponding electrical variables of function $T_3(x)$ are available at the output of this circuit.

The indicated formulas (2) and (3) are the formulas which are useful for the synthesis of any $T_n(x)$.

These formulas can be schematically represented, as already mentioned, as circuits in accordance with FIGS. 1 and 2. As a special case, from equation (3), for m=1, one obtains the well known formula $T_{n+1}(x)=2x\cdot T_n(x)-T_{n-1}(x)$, and for m=n, the formula $T_{2n}(x)=2\cdot T_n(x)^2-1$. Transposing equation (3), one also obtains $T_{n-m}(x)=2\cdot T_m(x)\cdot T_n(x)-T_{n+m}(x)$, which can likewise be realized by a circuit in accordance with FIG. 2. Assuming that $K(S_1)$ and $K(S_2)$ denote the costs for circuits $S_1$ and $S_2$ according to FIG. 1 and FIG. 2 without the Chebyshev modules contained therein. Depending on the circuits, one obtains in the case of a realization with operational amplifiers:

$K(S_1)=0$ $K(S_2)$=costs for multiplier circuits, 1 OV, 2 resistors

A cost calculation can now be drawn up for each of these circuits. One example best illustrates the procedure. To determine $T_{17}(x)$, one can formulate:

$$T_{17}(x)=2\cdot T_8(x)\cdot T_9-x=2\cdot T_2(T_2(T_2(x)))\cdot T_3(T_3(x))-x,$$

obtaining $k_{17}=3K_2+2K_3+K(S_2)$ since the costs $K(S_1)$ for realizing equation (2) are set here to equal zero.

| List of Reference Symbols | |
|---|---|
| 1 through 5 | Chebyshev modules |
| 6 | Circuit input |
| 7 | Multiplier circuit |
| 8 | Subtracter circuit |
| 9 | Squaring circuit |
| 10 | Operational amplifier |
| 11, 12 | Resistors |
| 13 | Constant voltage source |
| 14, 15 | Resistors |
| 16 | Circuit output |

What is claimed is:

1. A method of frequency multiplication, the method comprising:

providing a plurality of circuit modules for realizing Chebyshev polynomials of the nth order $T_n(x)$), the Chebyshev polynomials having arithmetic properties and being defined by $T_n(\cos(\omega t))=\cos(n\omega t)$;

interconnecting the circuit modules to form a modular circuit array or a modular circuit structure using at least one of the relations $T_{nm}(x)=T_n(T_m(x))$ and $T_{n+m}(x)=T_n(x)T_m(x)-T_{n-m}(x)$; and applying to an input of the circuit module for the Chebyshev polynomial ($T_n(x)$) a cosinusoidal oscillation having a first frequency so as to generate a cosinusoidal oscillation having a second frequency at an output of the circuit module, the second frequency being a factor of n times the first frequency.

2. The method as recited in claim 1 wherein the Chebyshev polynomials are defined by $T_1(x)=1$, $T_2(x)=2x^2-1$ and $T_{n+1}(x)=2xT_n(x)-T_{n-1}(x)$ for n=1,2,3 . . .

3. A method of frequency multiplication, the method comprising:

providing a plurality of circuit modules for realizing functions $T_n(x)=(\frac{1}{2})((x+(x^2-1)^{1/2})^n+(x-(x^2-1)^{1/2})^n)$, n being a rational or a real number;

interconnecting the circuit modules to form a modular circuit array or a modular circuit structure using at least one of the relations $T_{nm}(x)=T_n(T_m(x))$ and $T_{n+m}(x)=T_n(x)T_m(x)-T_{n-m}(x)$; and applying to an input of the circuit module for the function $(T_n(x))$ a cosinusoidal oscillation having a first frequency so as to generate a cosinusoidal oscillation having a second frequency at an output of the circuit module, the second frequency being a factor of n times the first frequency.

4. A circuit arrangement for frequency multiplication, the circuit arrangement comprising:

a first circuit module for realizing a first Chebyshev polynomial $T_m(x)$ defined by $T_m(\cos(\omega t))=\cos(m\omega t)$, the first circuit module being capable of accepting a first sinusoidal/cosinusoidal oscillation input having a first frequency and outputing a third sinusoidal/cosinusoidal oscillation having an third frequency, the third frequency being a factor of m times the first frequency; and a second circuit module for realizing a Chebyshev polynomial $T_n(x)$ defined by $T_n(\cos(\omega t))=\cos(n\omega t)$, the second circuit module being capable of accepting a second sinusoidal/cosinusoidal oscillation input having a second frequency and outputing a fourth sinusoidal/cosinusoidal oscillation having fourth frequency, the fourth frequency being a factor of n times the second frequency, the second circuit module being connected to the first circuit module to form a modular circuit array or a modular circuit structure using at least one of the relations $T_{nm}(x)=T_n(T_m(x))$ and $T_{n+m}(x)=T_n(x)T_m(x)-T_{n-m}(x)$.

5. The circuit arrangement as recited in claim 4 wherein the first and second circuit modules include at least one respective programmable or fixed-program semiconductor chip having arithmetic properties for realizing Chebyshev polynomials.

6. The circuit arrangement as recited in claim 4 wherein the first Chebyshev polynomial is $T_m(x)$, (x) being an input to the first circuit module, and wherein the second Chebyshev polynomial is $T_n(x)$, $T_{nm}(x)$ being an output of the second circuit module.

7. The circuit arrangement as recited in claim 4 further comprising a third circuit module for realizing a third Chebyshev polynomial, the first, second and third Chebyshev modules receiving (x) as an input variable via a shared input, and wherein the first and the second circuit modules are connected at an ouput side via a multiplier circuit, a two being applied to an input of the multiplier circuit, an output of the multiplier circuit being connnected with an output of the third circuit module via a subtracter circuit so as to realize Chebyshev polynomial $T_{n+m}(x)$.

8. The circuit arrangement as recited in claim 4 wherein at least one of the first and second Chebyshev polynomial is $T_2(x)$ and wherein at least one of the first and second circuit modules includes:

a squaring circuit;

an operational amplifier including a first input connected to the squaring circuit, an output and a second input of the operational amplifier being connected via a first resistor; and a constant current source connected to the second input of the operational amplifier via a second resistor.

9. The circuit arrangement as recited in claim 4 wherein at least one of the first and second Chebyshev polynomial is $T_3(x)$ and wherein at least one of the first and second circuit modules includes:

a squaring circuit, (x) being applied as an input signal to the squaring circuit;

an operational amplifier, a first input of the operational amplifier being connected to the squaring circuit via a first resistor, an output of the operational amplifier being fed back via a second resistor; and a multiplier circuit, an input of the multiplier circuit being connected to an output of the squaring circuit, an output of the multiplier circuit being connected to a second input of the operational amplifier.

10. The circuit arrangement as recited in claim 4 wherein the first and second circuit modules include at least one programmed or programmable semiconductor chip or similar device.

11. The circuit arrangement as recited in claim 4 wherein the modular circuit array or modular circuit structure includes a multiplier circuit, a subtracter circuit, a current or voltage source and supply and outgoing leads as an integrated single chip or multi-chip.

12. The circuit arrangement as recited in claim 11 wherein the modular circuit array or modular circuit structure includes an operational amplifier in the integrated single chip or multi-chip.

13. A circuit arrangement for frequency multiplication, the circuit arrangement comprising:

a first circuit module for realizing a first function $T_m(x)$ defined by $T_m(x)=(\frac{1}{2})((x+(x^2-1)^{1/2})^m+(x-(x^2-1)^{1/2})^m)$, m being a rational or a real number, the first circuit module being capable of accepting a first sinusoidal/cosinusoidal oscillation input having a first frequency and outputting a third sinusoidal/cosinusoidal oscillation having an third frequency, the third frequency being a factor of m times the first frequency; and a second circuit module for realizing a second function $T_n(x)$ defined by $T_n(x)=(\frac{1}{2})((x+(x^2-1)^{1/2})^n+(x-(x^2-1)^{1/2})^n)$, n being a rational or a real number, the second circuit module being capable of accepting a second sinusoidal/cosinusoidal oscillation input having a second frequency and outputting a fourth sinusoidal/cosinusoidal oscillation having fourth frequency, the fourth frequency being a factor of n times the second frequency, the second circuit module being connected to the first circuit module to form a modular circuit array or a modular circuit structure using at least one of the relations $T_{nm}(x)=T_n(T_m(x))$ and $T_{n+m}(x)=T_n(x)T_m(x)-T_{n-m}(x)$.

14. The circuit arrangement as recited in claim 13 wherein at least one of the first and second functions is $T_2(x)$ and wherein at least one of the first and second circuit modules includes:

a squaring circuit;

an operational amplifier including a first input connected to the squaring circuit, an output and a second input of the operational amplifier being connected via a first resistor; and a constant current source connected to the second input of the operational amplifier via a second resistor.

15. The circuit arrangement as recited in claim 13 wherein the first and second circuit modules include at least one programmed or programmable semiconductor chip or similar device.

16. The circuit arrangement as recited in claim 13 wherein the modular circuit array or modular circuit structure includes a multiplier circuit a subtracter circuit, a current or voltage source and supply and outgoing leads as an integrated single chip or multi-chip.

17. The circuit arrangement as recited in claim 16 wherein the modular circuit array or modular circuit structure includes an operational amplifier in the integrated single chip or multi-chip.

* * * * *